Patented Oct. 3, 1922.

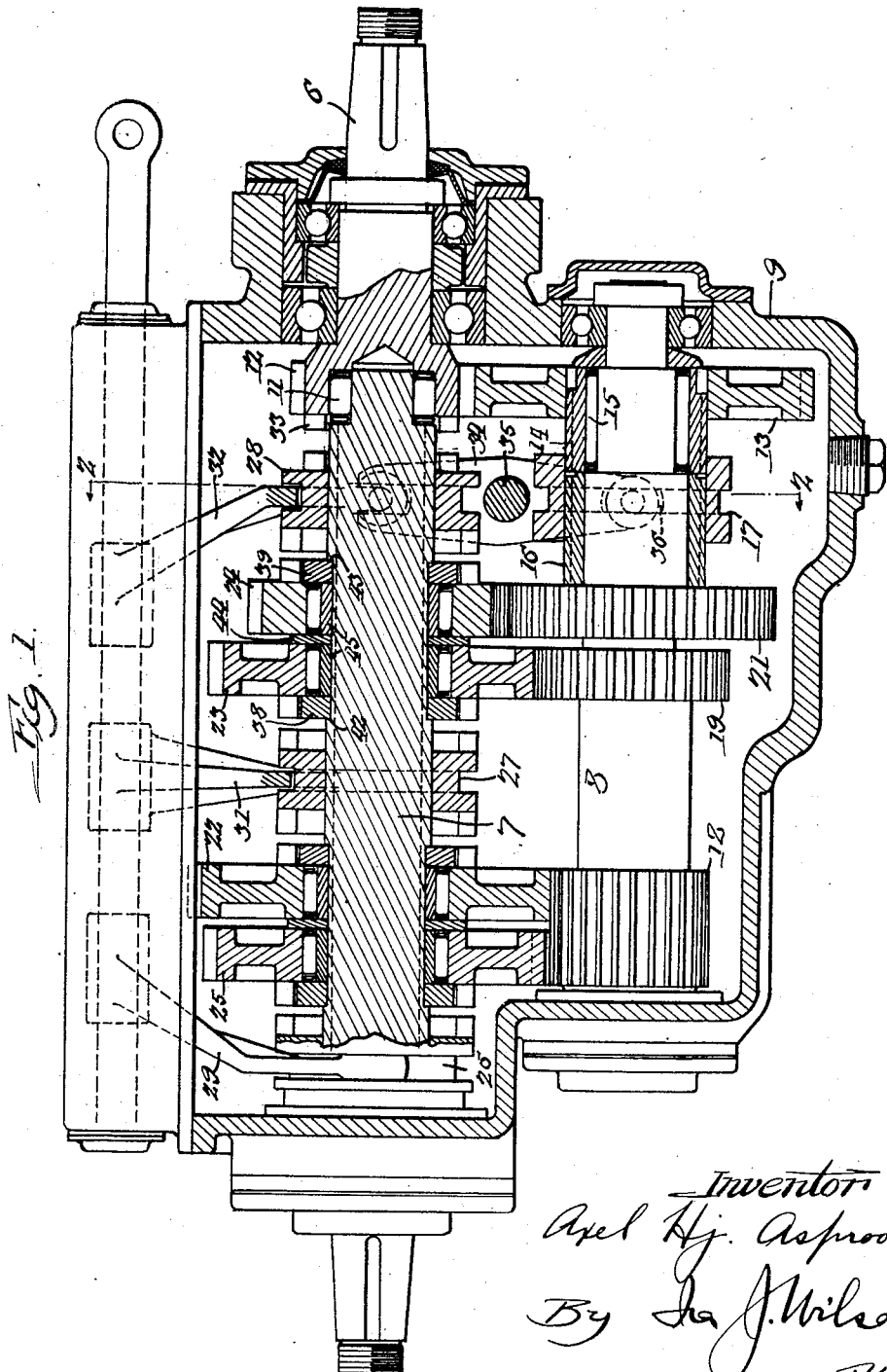

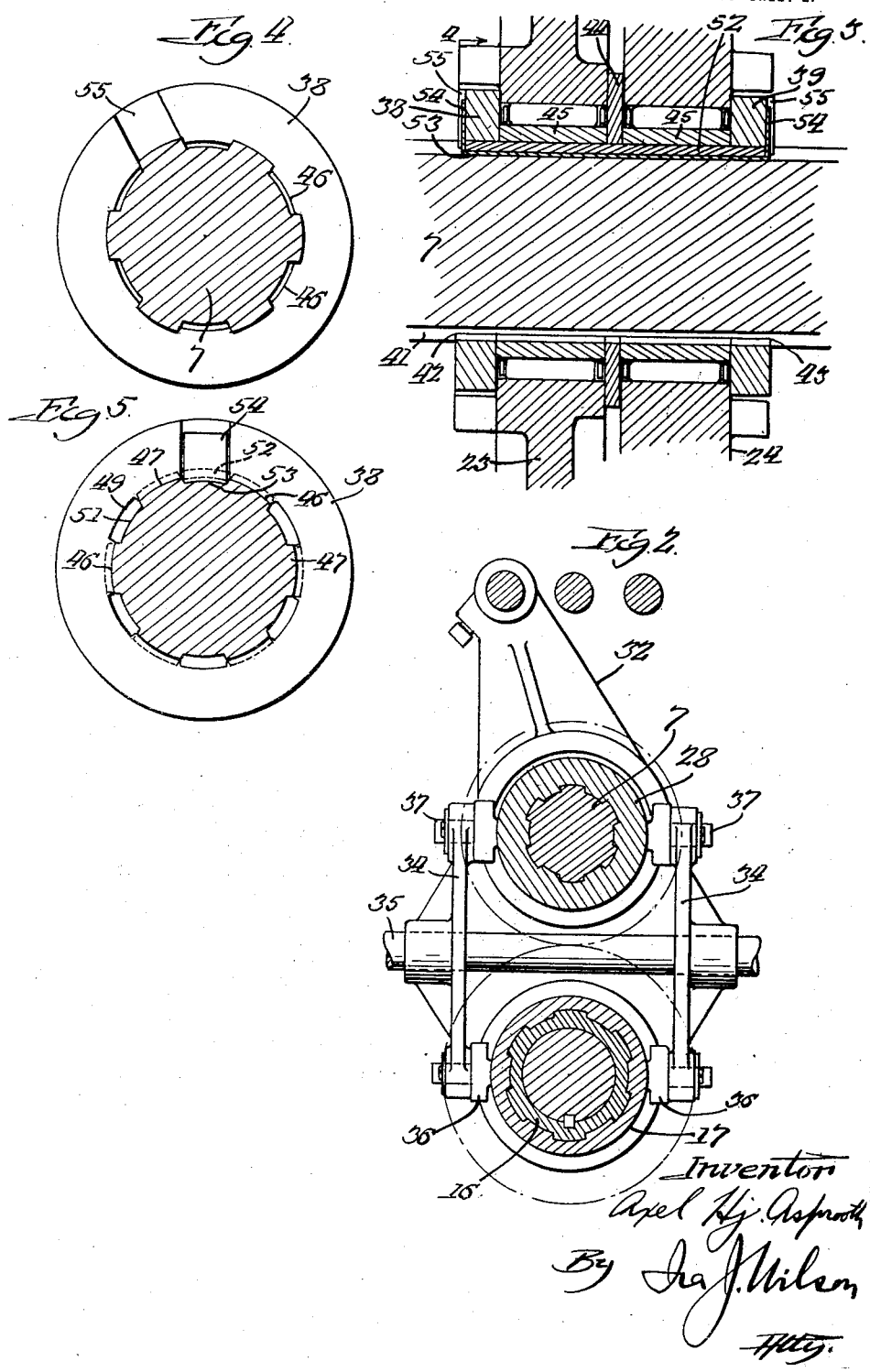

1,430,526

UNITED STATES PATENT OFFICE.

AXEL HJ. ASPROOTH, OF ROCKFORD, ILLINOIS, ASSIGNOR TO COTTA TRANSMISSION COMPANY, OF ROCKFORD, ILLINOIS, A CORPORATION OF ILLINOIS.

CHANGE-SPEED GEARING.

Application filed July 2, 1919. Serial No. 308,325.

*To all whom it may concern:*

Be it known that I, AXEL HJ. ASPROOTH, a citizen of the United States, residing at Rockford, in the county of Winnebago and State of Illinois, have invented certain new and useful Improvements in Change-Speed Gearing, of which the following is a specification.

This invention has reference to change speed gearing of the kind disclosed in my Patent No. 1,262,618, granted April 16, 1918, that is, to a transmission unit especially adapted for use in motor vehicles of various descriptions and characterized by the features of the gears being always in mesh and the different changes in speed being effected by means of clutches.

One of the objects of the present invention is to improve the driving connection between the driving shaft and countershaft and also to improve the clutch shifting means, especially with respect to the direct speed clutch and the clutch which connects the countershaft with the driving shaft. One of the features concerned in these improvements is the arrangement of the clutches so that the direct speed and countershaft clutches which are moved in unison, will be so actuated that the direct speed clutch will be entirely disengaged before the countershaft clutch is engaged, and vice versa. Thus in the event the engine should stop while the direct speed clutch is engaged, there will be no difficulty in throwing out this clutch as sometimes occurs in prior constructions.

Referring to the drawing:—

Figure 1 is a vertical longitudinal sectional view through a change speed gearing embodying my improvements;

Fig. 2, a fragmentary sectional view taken substantially on the line 2—2 of Fig. 1;

Fig. 3, an enlarged detail sectional view through the driven shaft showing the improved mounting and the gears loose thereon;

Fig. 4, a cross-sectional view taken on the line 4—4 of Fig. 3, but showing the end collar in the position when assembling; and Fig. 5, a similar sectional view showing the end collar moved to its operative position, corresponding to the showing in Fig. 3.

In this case, I have illustrated only such parts of the change speed gearing as are necessary for a clear understanding of my present improvements. The driving shaft 6, driven shaft 7, and countershaft 8, all designated generally, may be suitably journaled in a casing 9, the driven shaft 7 being mounted at its driven end on a roller bearing 11 in the adjacent end of the driving shaft 6, as is well known in this type of gearing. The driving shaft 6 has integrally united therewith a driving gear 12 constantly in mesh with a gear 13 loose on the countershaft. In the present instance this gear 13 is rigidly secured to what might be termed a hub 14 journaled on a roller bearing 15 on the reduced portion of the countershaft and is splined on its periphery corresponding to the splined member 16, Fig. 2, which is fixedly united to the countershaft. A clutch collar 17 splined on the countershaft section 16 and slidable lengthwise onto and off the splined hub 14 is adapted to establish driving connection between the driving shaft and the countershaft 8. The clutch collar is operated by means which will be presently described. A plurality of differently sized gears 18, 19 and 21 fixed to the countershaft are continuously in mesh with gears 22, 23 and 24 respectively, loose on the driven shaft. The gear 25 also loose on the driven shaft meshes with an intermediate gear, not shown, in turn in mesh with the gear 18 for effecting the reverse drive. The gears loose on the driven shaft are adapted to be individually connected thereto through the agency of heavy jaw toothed clutches for effecting the different speeds. For this purpose, there are three shiftable clutch elements 26, 27 and 28 splined on the driven shaft and adapted to be shifted by forks 29, 31 and 32 respectively. These forks in turn may be shifted by any suitable mechanism, such for example as of that type disclosed in my patent mentioned above.

Assuming that the countershaft is connected to the driving shaft by the clutch collar 17, all of the gears will be revolved, leaving the driven shaft stationary. By shifting the fork 31 to the left, Fig. 1, the clutch element will connect the gear 22 to the driven shaft to effect the first speed, and upon shifting it to the right the gear 23 will be connected to said shaft, effecting the second speed. The third speed is obtained by shifting the fork 32 to the left to connect the gear 24 to the driven shaft, and a fourth or direct speed by shifting the fork 32 to the right to connect the clutch element 28 directly to the jaw teeth 33 formed integral with the gear 12. The fork 29 is shiftable to obtain the reverse, as will be obvious.

When the fork 32 is shifted to engage the fourth or direct speed clutch, the countershaft clutch will by the same movement be thrown out, thus leaving the countershaft and gears connected therewith idle. To this end, I provide a connection between the clutch elements 17 and 28 designed to operate them in unison in such manner that the clutch 17 will be disengaged from the splined hub 14, prior to engagement of the teeth of the clutch element 28 with the teeth 33. This connection comprises in the present instance, a pair of levers 34 pivotally mounted on a shaft 35 suitably supported intermediate the driven shaft and countershaft and carrying blocks 36 at their lower end engaged in the groove in the clutch collar 17 and having a suitable pivotal connection at their upper end with the outstanding pins 37 on the fork 32. It will be observed that the clutch elements are so relatively arranged that when the fork is moved to the right, viewing Fig. 1, the clutch collar 17 will be entirely withdrawn from the splined hub 14 before the teeth on the clutch element 28 engage the teeth 33. Thus if it should happen that the engine should stop while the direct or fourth speed clutch is engaged, this clutch may be instantly disengaged without interference between the clutch collar 17 and the teeth on the splined hub 14 in the event that the spline on the latter is not in alignment with that on the part 16. It will thus be seen that I have provided a simple and positive means for operating the direct speed clutch and the countershaft clutch in the proper timed relation, and so as to avoid interferences in any kind.

Coming now to the mounting of the gears 22 to 25 inclusive on the driven shaft, it will be observed that these gears simply revolve loosely on the shaft, and motion is transmitted by the gears to the shaft through the agency of the several clutches. One of the features of the present invention is the mounting and retaining of these gears on a splined shaft in a most simple, economical and practical manner. The shaft is splined from end to end, and the problem of performing various facing operations and threading the shaft at different points for the reception of end thrust collars is eliminated. Instead, the splined portion is turned down about midway of the depth of the teeth and throughout a length sufficient to receive a pair of gears, such for example as the gears 23 and 24, and the end thrust collars 38 and 29. As shown in Fig. 3, the longitudinal teeth or splines 41 on the shaft are turned down between the shoulders 42 and 43, giving a splined shaft section of reduced diameter. The end thrust collars 38 and 39, the gear spacing ring 44 and the inner race collars 45 for the roller bearings are shaped internally, corresponding to the peripheral shape of the splined shaft 7 as shown in Fig. 4, except that the splines 46 are of a depth corresponding to the reduced depth of the splines 47 on the shaft 7. Thus, the parts 52, 53, 44, 45, and gears 23 and 24 in their proper assembled relation may be slid lengthwise onto the shaft in the manner shown in Fig. 4 until they overlie the reduced splined portion between the shoulders 42 and 43. The interiorly splined parts are then given a partial rotation, in this instance one twelfth of a turn as shown in Fig. 5, to align the grooves 49 of these parts with the grooves 51 in the shaft, or in other words, to position the teeth or splines 46 in alignment with the splines 47 on the shaft. In this position a key 52 is slid lengthwise into one of the channels formed by the aligned grooves 49 and 51 and extends from side to side thereof, thus preventing rotative movement of the several parts on the shaft. In order to prevent longitudinal displacement of the key, a sheet metal retaining key 53 is slid under the key 52 and the ends 54 are turned out into the grooves 55 in the end faces of the collars 38 and 39. It will thus be seen that the several parts interposed between the shoulders 42 and 43 are held by these shoulders against lengthwise movement on the shaft and against rotative movement thereon by the key 52 and that the latter is held in position by the retaining or locking key 53. The collars 38 and 39 obviously serve to hold the gears 23 and 24 in position on their bearings.

It is believed that the foregoing conveys a clear understanding of the principles and objects of my invention, and while I have illustrated and described but a single working embodiment thereof, it should be understood that various changes might be made in the construction and arrangement without departing from the spirit and scope of the invention as expressed in the appended claims, in which—

I claim:

1. In change speed gearing, the combination of a driving shaft and a driven shaft, a countershaft, a gear loose on the countershaft and in mesh with a gear fixed to the driving shaft, a circumferentially splined part fixed to said gear on the countershaft, a circumferentially splined part fixed to the countershaft and adapted to register with the first mentioned splined part, a clutch member shaped to fit said splined parts and to slide axially on the second mentioned splined part into and out of engagement with the first mentioned splined part, a clutch for connecting the driving and driven shafts, means for shifting this clutch, and means operated by this clutch upon movement thereof in opposite directions for positively moving the first mentioned clutch part in reverse directions.

2. In change speed gearing, the combination of a driving shaft and a driven shaft, a countershaft, a gear loose on the countershaft and in mesh with a gear fixed to the driving shaft, a circumferentially splined part fixed to said gear on the countershaft, a circumferentially splined part fixed to the countershaft and adapted to register with the first mentioned splined part, a clutch member shaped to fit said splined parts and to slide axially on the second mentioned splined part into and out of engagement with the first mentioned splined part, a clutch for connecting the driving and driven shafts, means for shifting this clutch, and means operated by this clutch upon movement thereof in opposite directions for positively moving the first mentioned clutch part in reverse directions, the countershaft clutch and direct speed clutch being so relatively positioned and connected by the last named means that the countershaft clutch will be wholly disengaged before engagement to the direct speed clutch, and vice versa.

AXEL HJ. ASPROOTH.